(12) United States Patent
Bartel et al.

(10) Patent No.: US 10,981,589 B1
(45) Date of Patent: Apr. 20, 2021

(54) STEERING MECHANISM

(71) Applicant: Excel Industries, Inc., Hesston, KS (US)

(72) Inventors: Harlan John Bartel, North Newton, KS (US); Brian Roy Funk, Lehigh, KS (US)

(73) Assignee: Excel Industries, Inc., Hesston, KS (US)

( * ) Notice: Subject to any disclaimer, the term of this patent is extended or adjusted under 35 U.S.C. 154(b) by 653 days.

(21) Appl. No.: 14/621,745

(22) Filed: Feb. 13, 2015

Related U.S. Application Data

(63) Continuation of application No. 13/584,282, filed on Aug. 13, 2012, now abandoned, which is a continuation-in-part of application No. 12/586,411, filed on Sep. 22, 2009, now Pat. No. 8,240,420.

(60) Provisional application No. 61/197,199, filed on Oct. 23, 2008.

(51) Int. Cl.
*B62D 1/12* (2006.01)

(52) U.S. Cl.
CPC ..................... *B62D 1/12* (2013.01)

(58) Field of Classification Search
CPC ........ B62D 15/021; B62D 5/091; B62D 5/04; B63H 2021/216
USPC .............................. 180/6.5; 74/486
See application file for complete search history.

(56) References Cited

U.S. PATENT DOCUMENTS

| | | | |
|---|---|---|---|
| 3,392,696 A * | 7/1968 | Buckley, Jr. ........... | B63H 21/22 415/32 |
| 3,702,051 A | 11/1972 | Deines | |
| 5,496,226 A | 3/1996 | Splittstoesser et al. | |
| 5,502,957 A | 4/1996 | Robertson | |
| 5,894,714 A | 4/1999 | Braun et al. | |
| 5,913,802 A | 6/1999 | Mullet et al. | |
| 5,946,894 A | 9/1999 | Eavenson et al. | |
| 6,056,074 A | 5/2000 | Heal et al. | |
| 6,227,327 B1 * | 5/2001 | Nigrin ....................... | B62D 1/04 180/402 |
| 6,301,864 B1 | 10/2001 | Damie et al. | |
| 6,343,668 B1 | 2/2002 | Dean | |
| 6,434,917 B1 * | 8/2002 | Bartel ..................... | A01D 34/64 180/286 |
| 6,729,115 B2 | 5/2004 | Bartel | |
| 7,299,610 B2 * | 11/2007 | Piontek .................. | A01D 34/64 180/286 |

(Continued)

FOREIGN PATENT DOCUMENTS

JP            03-1877    *   1/1991    ............... B62D 5/04

*Primary Examiner* — Randell J Krug

(74) *Attorney, Agent, or Firm* — Shook, Hardy & Bacon, LLP

(57) ABSTRACT

A steering lever mechanism for a mower vehicle includes a lever assembly and a base which is fixed to the mower vehicle for mounting the lever assembly to the mower. The lever assembly includes a pivot assembly and a lever portion. The lever portion is pivotably mounted to the pivot assembly for rotation about a longitudinal axis between an inboard position and an outboard position. The pivot assembly is also pivotably mounted to the base for rotation of the pivot bracket portion and the lever portion about a transverse axis between a rear position, an intermediate neutral position and a forward position. A rotation-measuring device is associated with the base and the pivot assembly for measuring the forward and rear rotation of the lever assembly.

10 Claims, 8 Drawing Sheets

(56) References Cited

U.S. PATENT DOCUMENTS

| | | | |
|---|---|---|---|
| 7,575,491 B1* | 8/2009 | Martin | B63H 21/213 |
| | | | 440/6 |
| 7,677,371 B2* | 3/2010 | Dong | A01D 69/10 |
| | | | 188/350 |
| 2006/0060019 A1 | 3/2006 | Sato et al. | |
| 2006/0128489 A1 | 6/2006 | Mooney et al. | |
| 2006/0180385 A1* | 8/2006 | Yanai | B62D 1/16 |
| | | | 180/444 |
| 2009/0217636 A1* | 9/2009 | Loxterkamp | A01D 34/64 |
| | | | 56/10.8 |

* cited by examiner

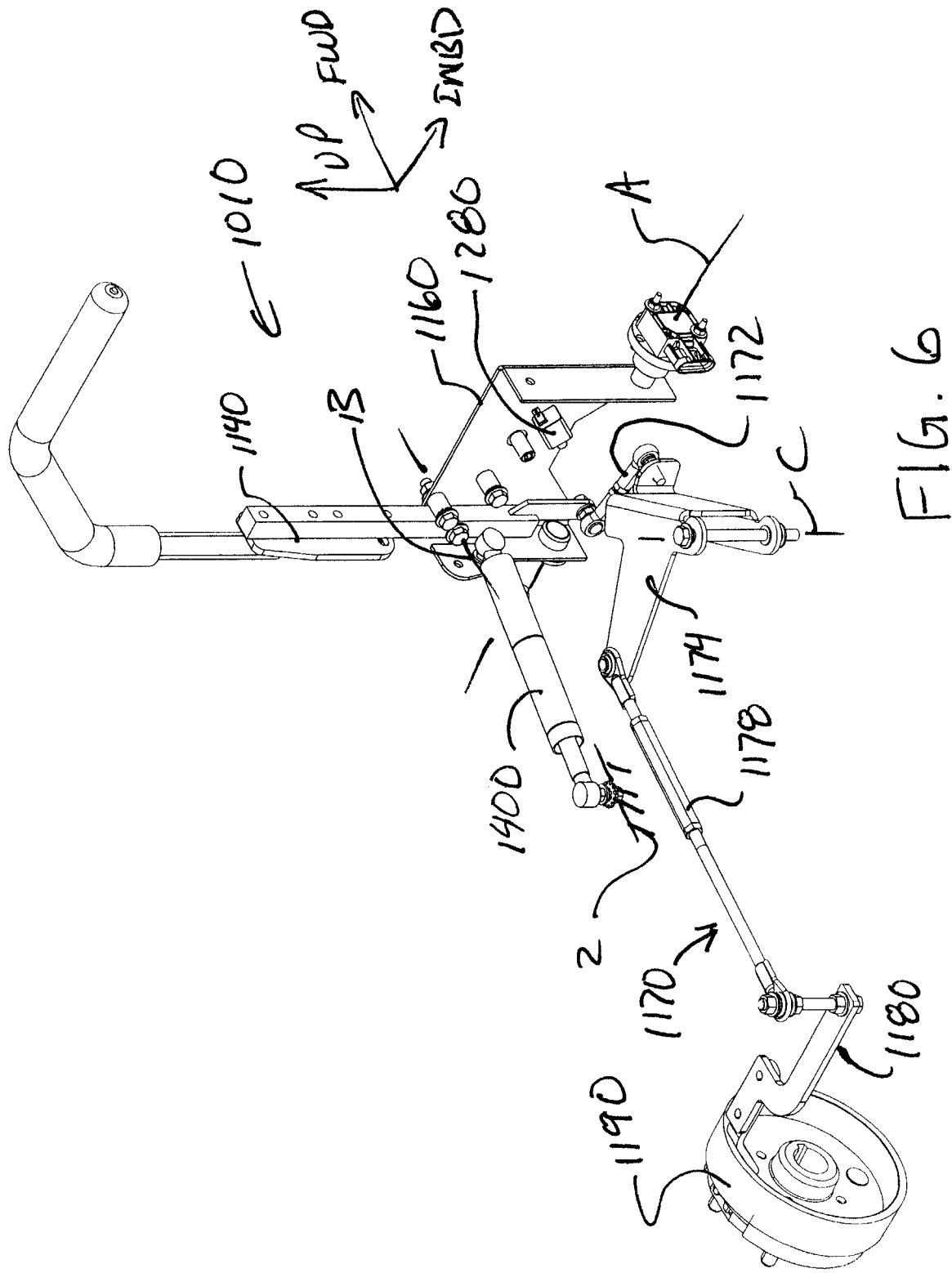

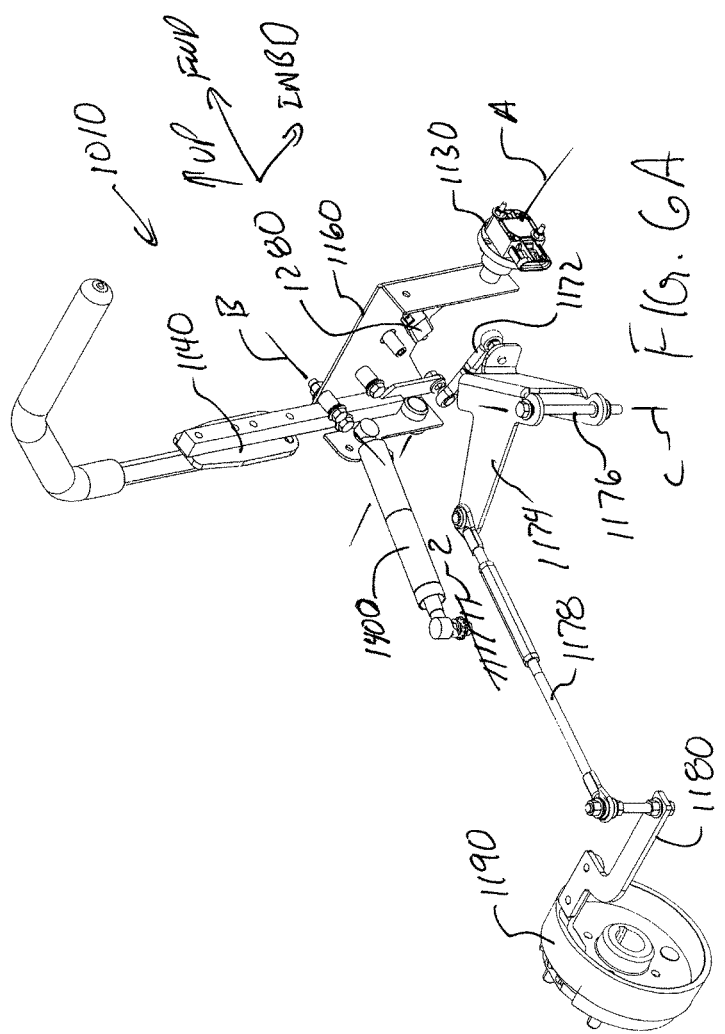

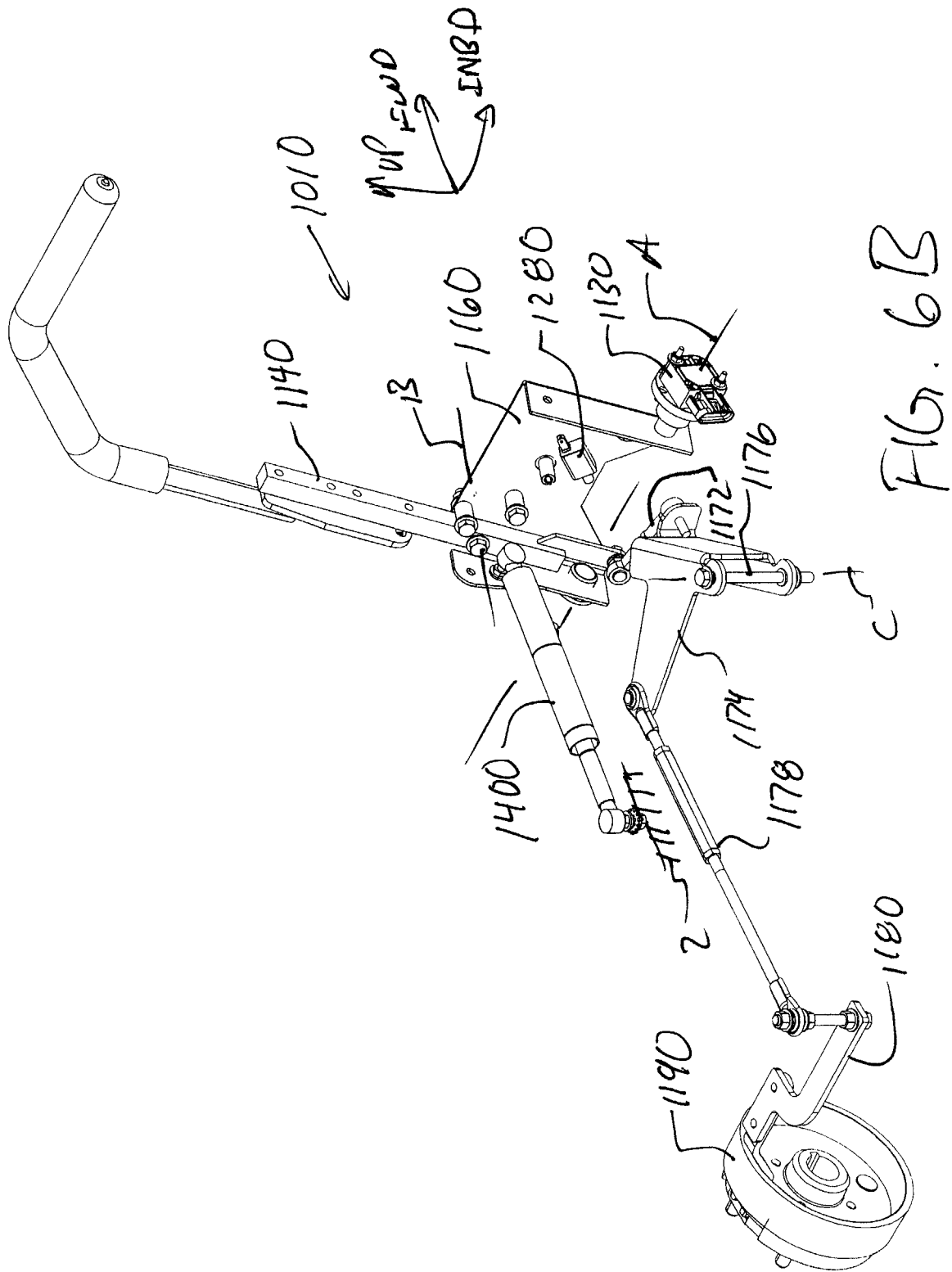

STEERING MECHANISM

This application is a continuation of U.S. patent application Ser. No. 13/584,282 filed on Aug. 13, 2012 which is incorporated herein by reference.

U.S. patent application Ser. No. 13/584,282 was a continuation-in-part for U.S. patent application Ser. No. 12/586,411 filed on Sep. 22, 2009, now U.S. Pat. No. 8,240,420, which is also incorporated herein by reference.

U.S. patent application Ser. No. 12/586,411 claimed the benefit of U.S. Provisional Patent Application No. 61/197,199 filed Oct. 23, 2008, which is incorporated herein by reference.

FIELD

The present invention relates to a steering mechanism for a riding lawn mower.

BACKGROUND

Zero turn electric lawn mowers have been known in the art for several years. An example combined steering and brake control lever mechanism is taught by U.S. Pat. No. 6,729,115 issued to Bartel. The applicant's incorporate U.S. Pat. No. 6,729,115 herein as if repeated verbatim hereinafter. U.S. Pat. No. 6,729,115 teaches a mechanism which includes left and right steering levers. In the arrangement taught in U.S. Pat. No. 6,729,115 each of the steering levers independently control hydraulic valves which in turn control the flow of hydraulic fluid to one of either the left or right hydraulic drive wheel motors. Thus, in the steering control system taught in U.S. Pat. No. 6,729,115, if the operator pushes the right steering lever forward of the neutral position, the right drive wheel will rotate in a forward direction and if the operator pulls the right steering lever back from the neutral position, the right drive wheel will rotate in a reverse direction. The same is true for the left steering lever. Moreover, in the arrangement taught in U.S. Pat. No. 6,729,115, each steering lever may be pushed outboard when it is in the neutral position and if the operator pushes a steering lever outboard from the neutral position, a linkage is actuated to engage a parking brake associated with the wheel on the same side of the mower. The driving feel of the hydraulic based arrangement described in U.S. Pat. No. 6,729,115 has been well received by operators. The hydraulic valves of the arrangement described in U.S. Pat. No. 6,729,115 provide feedback resistance in response to steering lever movements. Also, in the arrangement taught in U.S. Pat. No. 6,729,115 the outward movement of a steering handle from the neutral position to engage a parking brake moves linkage members in a parking brake linkage which in turn provides mechanical resistance to the outward movement of the handle. If an electric steering interface is selected for accomplishing the general functions of the arrangement taught by U.S. Pat. No. 6,729,115, then the problem of providing feedback through the steering handles to the operator arises. What is needed is an electric zero turn radius (ZTR) steering and brake interface which provides substantially the same feel as the arrangement taught in U.S. Pat. No. 6,729,115.

BRIEF DESCRIPTION OF THE INVENTION

The present invention answers this need by providing steering lever mechanism which includes a lever assembly and a base including at least one bracket fixed to the frame of the mower vehicle for mounting the lever assembly to a mower vehicle. The lever assembly includes a pivot assembly and a lever portion. The pivot assembly is pivotably mounted to the base for rotation of the pivot assembly and the lever portion about a transverse axis between a rear position, an intermediate neutral position and a forward position. A position-measuring device is associated with the base and the pivot assembly for measuring the forward and rear rotation of the lever assembly. A mechanical resistance device connects between pivot assembly and the frame of the mower vehicle for resisting rotation of the pivot assembly and the lever assembly between the forward position and the rear position. The lever portion is also pivotably mounted to the pivot assembly for rotation about a longitudinal axis between an inboard position and an outboard position. A sensor for activating a parking brake is also associated with the base for sensing the lever portion when it is in the outboard position. A cam member is fixed to the lever portion and has first and second recesses. A cam follower is pivotably mounted to the pivot assembly and is spring biased for engaging one of the first or second recesses of the cam member. The cam follower and the cam member are arranged such that the cam follower is urged into the first recess when the lever portion is in the inboard position and such that the cam follower is urged into the second recess when the lever portion is in the outboard position. At least one of the brackets of the base includes a slot which is located to receive the lever portion when the lever portion is in the neutral position (with respect to forward and backward rotation) as the lever portion rotates outboard. A stop member fixed to the base prevents the lever portion from rotating past the neutral outboard position. A sensor associated with the stop member produces a signal when the lever portion is in the neutral outboard position.

BRIEF DESCRIPTION OF THE DRAWINGS

FIG. 6 is a first perspective view of a second embodiment of the steering lever mechanism having a mechanical linkage for engaging a parking brake showing the steering lever in the neutral inboard position.

FIG. 6A is a second perspective view of a second embodiment of the steering lever mechanism showing the steering lever in the first back or aft position.

FIG. 6B is a third perspective view of a second embodiment of the steering lever mechanism showing the steering lever in the second forward position.

DETAILED DESCRIPTION

Figure 1:
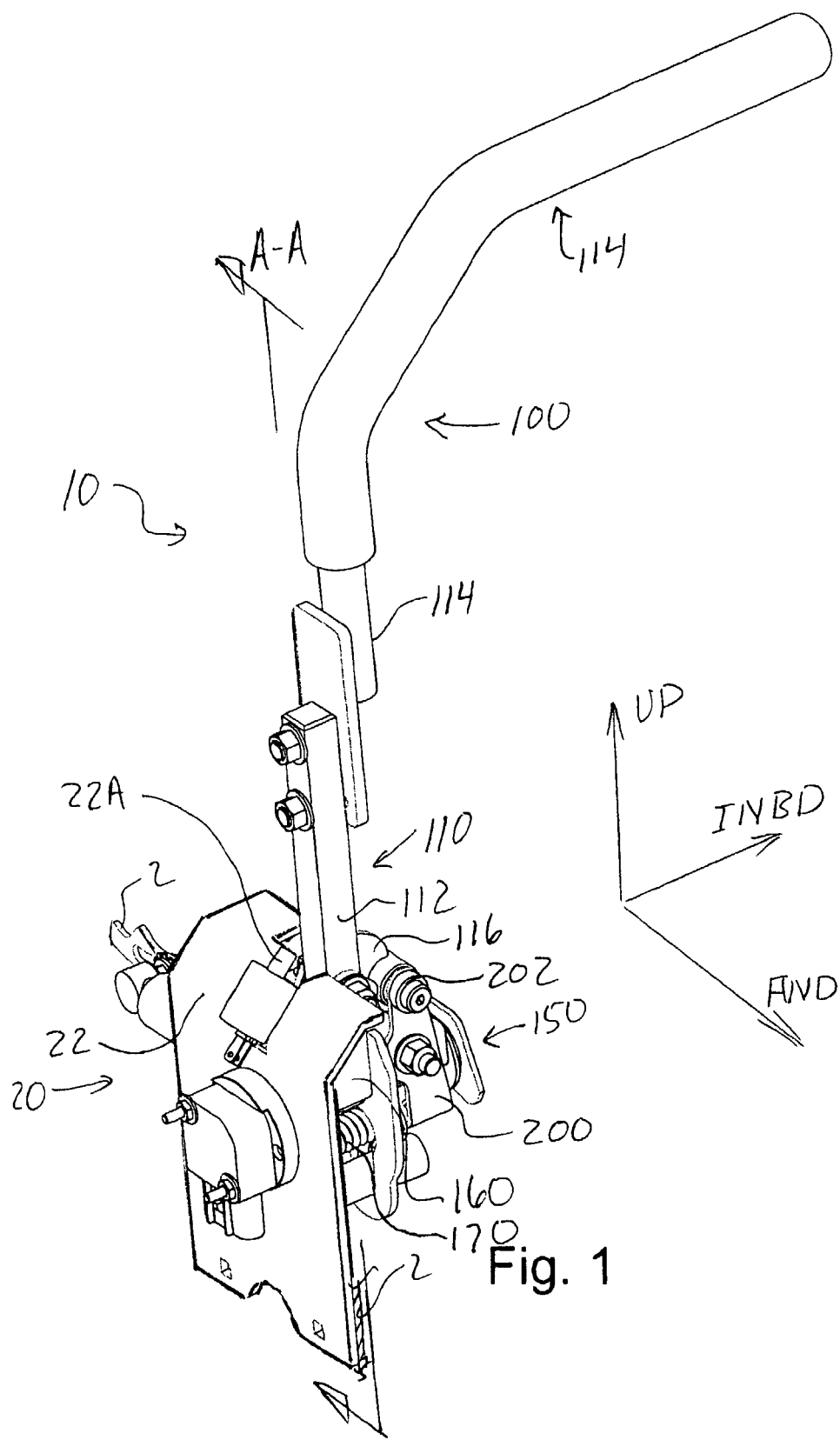
FIG. 1 is a first perspective view of the steering lever mechanism of the present invention.

Referring to the drawings, FIG. 1 provides a perspective view of a steering lever mechanism 10 which is mounted to a mower vehicle frame 2. Steering lever mechanism 10 generally includes a base 20 and a lever assembly 100. Base 20 further includes an outboard bracket 22 and an inboard bracket 24 (shown in FIG. 4) which are both fixed to a frame 2 of the mower vehicle.

As can be best seen in FIGS. 2-5, lever assembly 100 includes a lever portion 110 and a pivot assembly 150. Lever portion 110 includes a lower lever member 112 and a handle 114 which is fixed to the upper end of lower lever member 112. Handle 114 preferably includes padding 114A for operator comfort.

Figure 4:
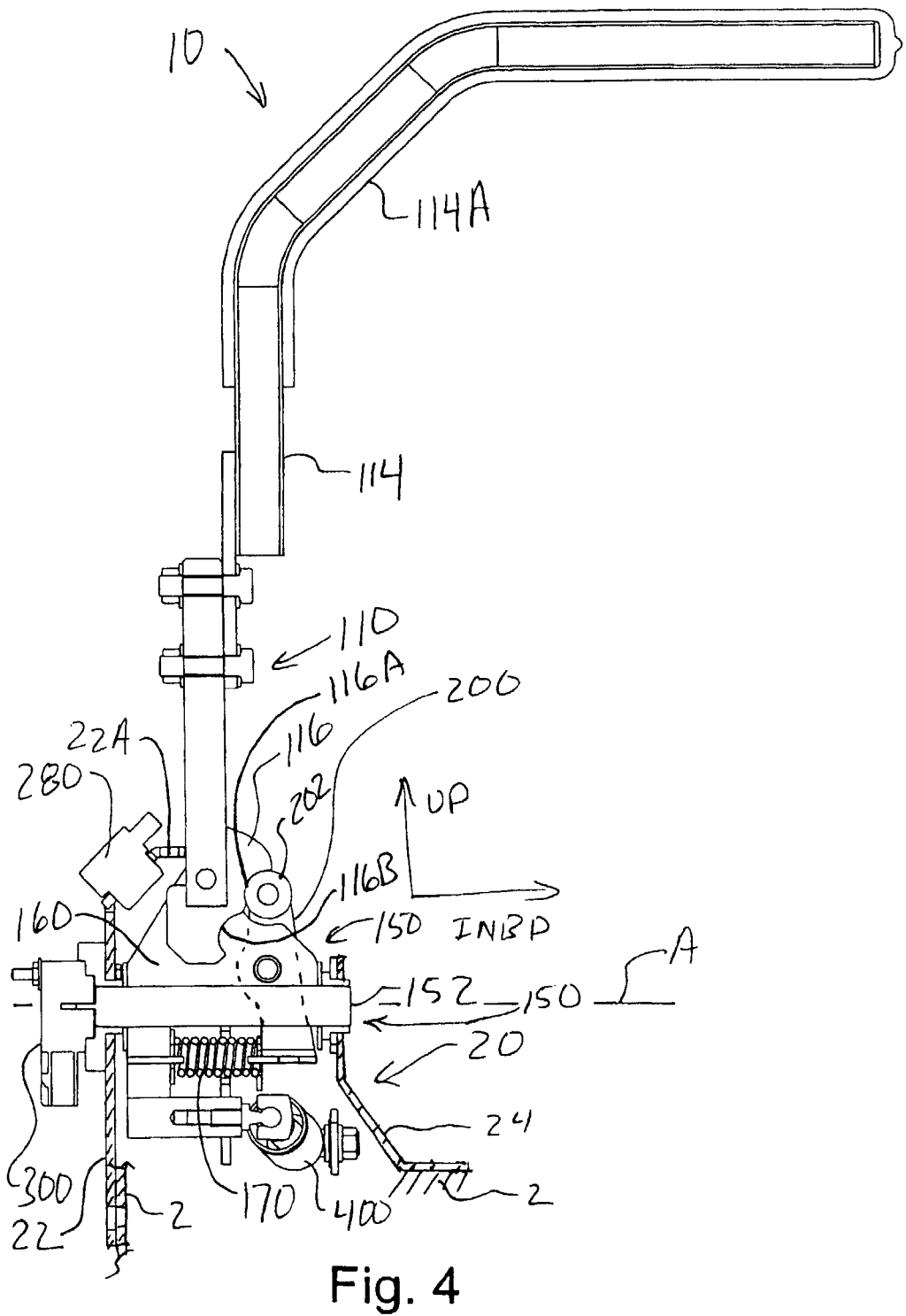
FIG. 4 is a sectional view of the steering lever mechanism of the present invention taken from plane A-A of FIG. 1 showing the lever assembly in the inboard position.
Figure 5:
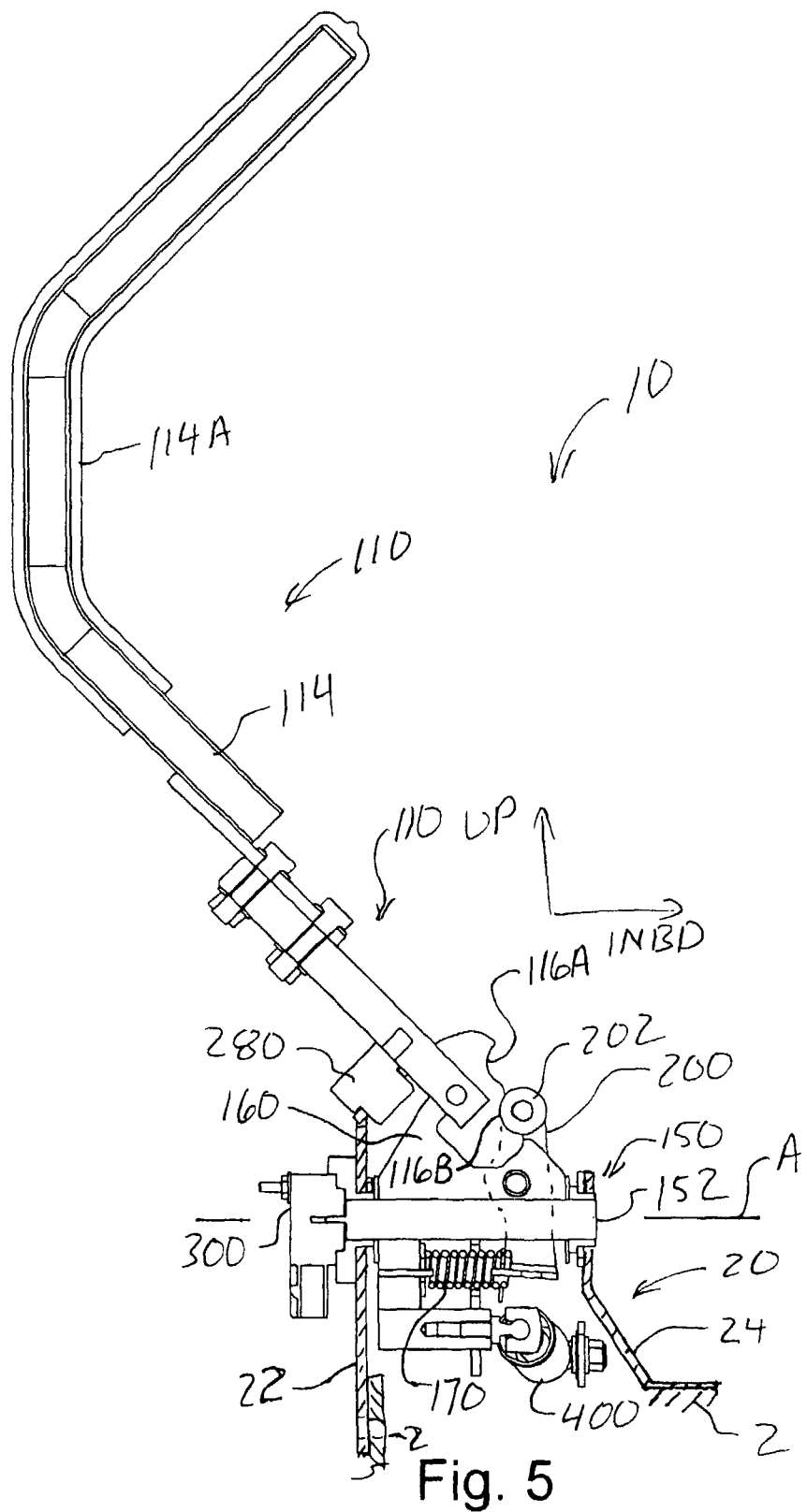
FIG. 5 is a sectional view of the steering lever mechanism of the present invention taken from plane A-A of FIG. 1 showing the lever assembly in the outboard position.

Pivot assembly 150 includes a pivot shaft 152 and a pivot bracket assembly 160. As is best shown in FIGS. 4 and 5, pivot shaft 152 is rotatably mounted to brackets 22 and 24 of base 20 for rotation about axis A which is generally a transverse axis parallel to the axis labeled INBD in the various figures. Pivot shaft 152 carries a pivot bracket assembly 160. As will be described in greater detail below, pivot bracket assembly 160 carries lever assembly 100.

Figures 2, 3:
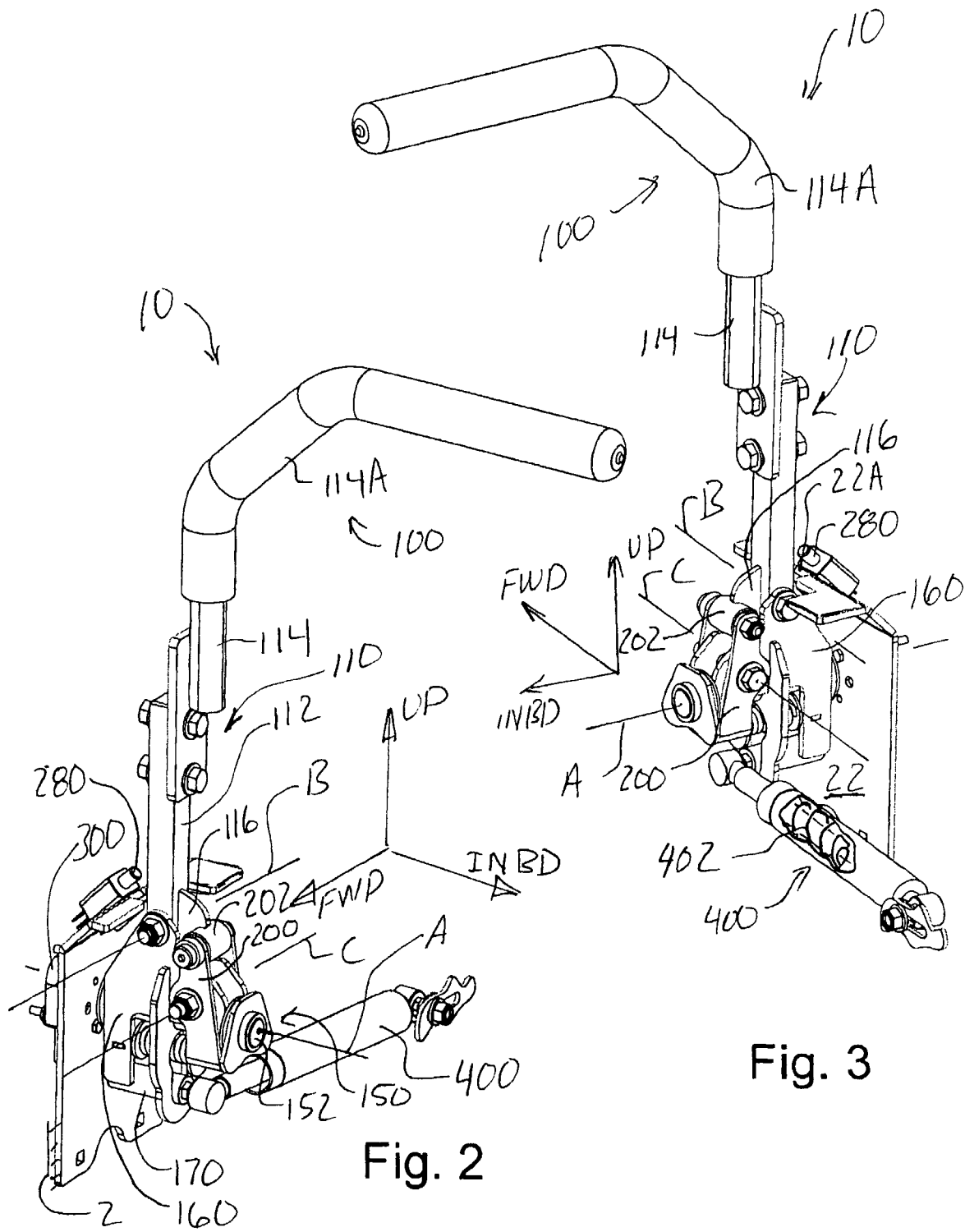
FIG. 2 is a second perspective view of the steering lever mechanism of the present invention.
FIG. 3 is a third perspective view of the steering lever mechanism of the present invention.

Lever assembly 100 is pivotably mounted to pivot bracket assembly 160 so that when permitted by a transverse slot 22A located near the upper end of outboard bracket 22, lever assembly 100 can rotate about axis B shown in FIG. 2 between an inboard position shown in FIG. 4 and an outboard position shown in FIG. 5. A cam follower arrangement is interposed between lever assembly 100 and pivot bracket assembly 160 so that lever assembly 100 is urged into one of the two above described positions as will be described in greater detail below.

As noted above, lower lever member 112 of lever assembly 100 is pivotably mounted to the upper end of pivot bracket assembly 160 for rotation about axis B shown in FIG. 2. As can best be seen in FIG. 4, a cam plate 116 is fixed to the lower end of lower lever member 112. Cam plate 116 includes a first recess 116A and a second recess 116B which are both adapted for receiving a cam roller 202. Cam roller 202 is rotatably mounted to a cam follower 200. Cam follower 200 is, in turn, pivotably mounted to pivot bracket assembly 160 for rotation about axis C shown in FIGS. 2 and 3. At its lower end below axis C and opposite from cam roller 202, cam follower 200 is spring biased by a compression spring 170 which urges cam roller 202 into one of first or second recess 116A or 116B of cam plate 116. Cam plate 116 is configured and located so that cam roller 202 tends to retain its position in either first or second recess 116A or 116B and does not move to the other recess unless an operator applies a force to lever assembly 100. Accordingly, lever assembly 100 tends to remain in the inboard position shown in FIG. 4 and when received by slot 22A will remain in the outboard position shown in FIG. 5 unless acted upon. An outboard lever position sensor 280 (shown in FIG. 4) mounted to outboard bracket 22 is adapted to detect lever assembly 100 when it is in the outboard position as shown in FIG. 5. Outboard lever position sensor 280 is preferably in communication with a parking brake system which, upon receiving an outboard position signal, engages at least one parking brake.

Lever assembly 100 is fixed to pivot bracket assembly 160 when considered from the perspective of rotation about a transverse axis. However pivot bracket assembly 160 is mounted to brackets 22 and 24 by shaft 152 for rotation about a transverse axis A shown in FIGS. 2 and 3. Shaft 152 interfaces with a rotation measurement device 300 mounted on the outboard side of outboard bracket 22. Position measurement device 300 may be potentiometer which is well known to those skilled in the art or any other suitable device capable of measuring displacement or rotation. Position measurement device 300 provides signals to a drive control system (not shown) which in turn determines whether the drive wheel controlled by lever assembly 100 rotates in a reverse direction, a forward direction or is stationary as indicated by a neutral lever assembly position such that the forward position indicates forward rotation at a maximum forward speed and such that the rear position indicates reverse rotation at a maximum reverse speed and so on for lesser speeds of rotation as indicated by intermediate positions of the lever assembly 100 between the neutral position and either the forward or rear positions.

The rotation of lever assembly 100 and the rotation of pivot bracket assembly 160 about axis dampener A is resisted by a dampener unit 400 which connects between the extreme lower end of pivot bracket assembly 160 and vehicle frame 2. In this example dampener unit 400 is a linear dampener which is adapted to resist the rotation of pivot bracket assembly 160 (and thus lever assembly 100) either in a forward or rear direction about axis A. In this example, dampener unit 400 preferably includes a compression spring 402 which is positioned within dampener unit 400 such that spring 402 biases lever assembly 100 away from the rear position and toward the neutral position. With this arrangement, the operator must apply constant pressure to cause the mower to move in reverse, yet, the operator merely moves lever assembly 100 to a forward position and holds lever assembly 100 in the selected forward position without applying constant pressure in order to cause the mower to move forward. In this example, dampener unit 400 is pivotably connected to frame 2 at its distal end and pivotably connected at its proximate end to a cylindrical lug 170 which is fixed to the lower end of pivot bracket assembly 160. Cylindrical lug 170 is spaced away from the axis of rotation A of pivot bracket assembly 160 so that rotation of pivot bracket assembly 160 about axis A causes displacement of the proximate end of dampener unit 400 relative to the fixed distal end of dampener unit 400.

Figure 7:
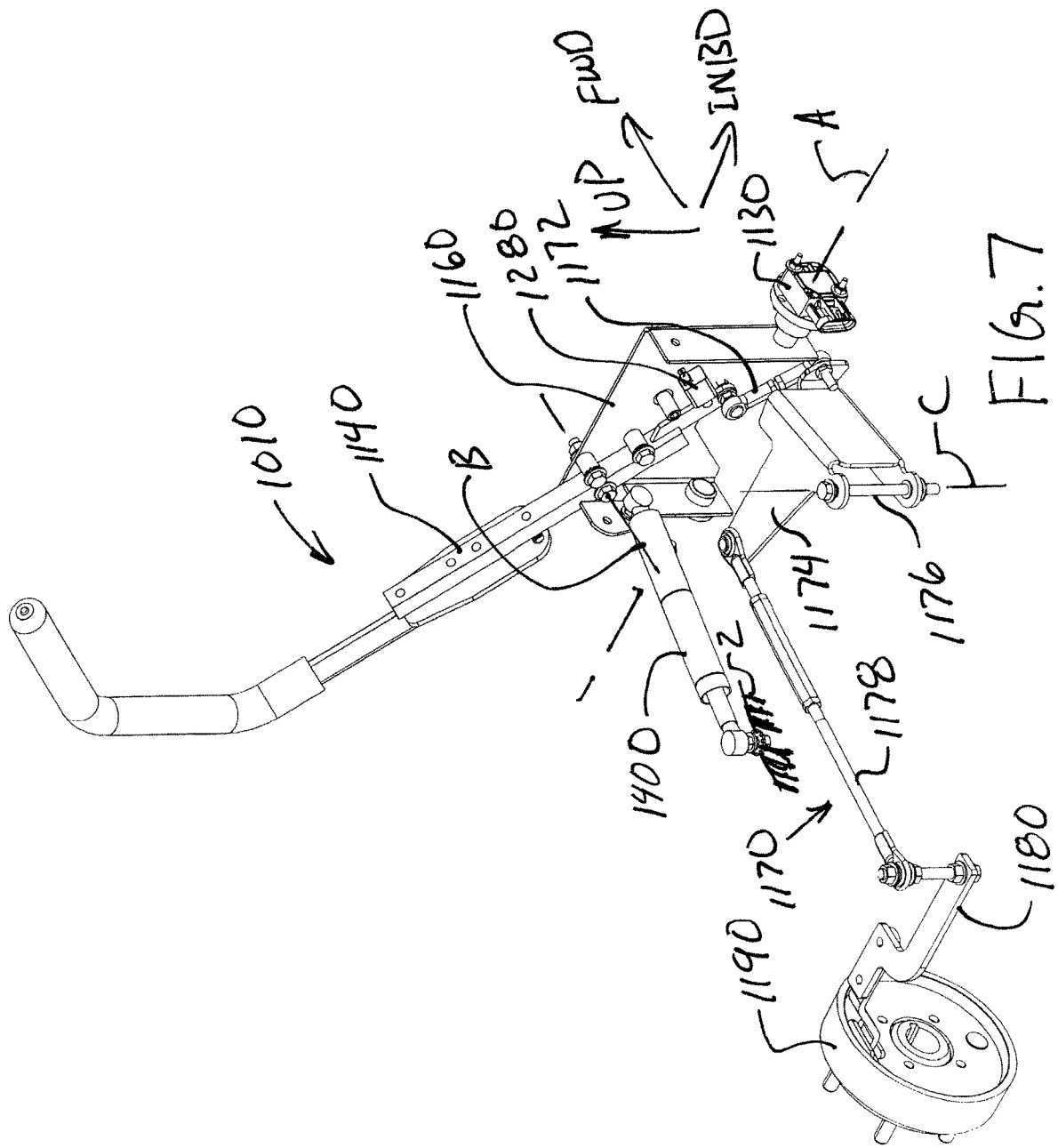
FIG. 7 is a fourth perspective view of the second embodiment of the steering lever mechanism showing the steering lever in the second outboard parking brake setting position.

FIGS. 6 and 7 illustrate a second embodiment steering mechanism 1010 which employs a mechanical parking brake linkage 1170. Steering mechanism 1010 includes a pivot bracket assembly 1160 which is rotatably mounted to the frame of a riding lawnmower (not shown) for rotation about axis A. Thus, pivot bracket assembly 1160 rotates about axis A between a first position as shown in FIG. 6A, through a neutral position shown in FIG. 6 to a second position shown in FIG. 6B. A position measurement device 1130 which in this example is a potentiometer that measures rotation of bracket assembly 1160 about axis A with respect to the vehicle frame. A damper unit 1400 generally similar to damper unit 400 described above is also connected between the frame of the mower vehicle 2 and pivot bracket assembly 1160. Damper unit 1400 performs generally the same function for steering mechanism 1010 as does damper unit 400 for steering mechanism 10 described above. A lever assembly 1110 is pivotably mounted to pivot bracket assembly 1160 for rotation with respect to pivot bracket assembly 1160 about axis B which, in this example, is generally normal to axis A but fixed with respect to pivot bracket assembly 1160. Lever assembly 1110 pivots between a first position shown in FIG. 6 and a second position shown in FIG. 7 which in this example is a first inboard position and a second outboard position respectively. The skilled reader should understand that an identical symmetrical steering mechanism 1010 is also present on the opposite side of the mower vehicle which is only indicated a frame 2 in FIGS. 6-7.

FIG. 6 shows steering mechanism 1010 with lever 1110 in the first, inboard operating position. FIGS. 6-7 illustrate a mechanical parking brake mechanism 1170 that extends between the lower end of lever 1110 and a parking brake 1190 which is associated with one of the wheels of the mower. As can be seen in FIG. 6, when lever 1110 is in the first, inboard position, parking brake mechanism 1170 is generally in an aft position appropriate for disengaging a parking brake 1190. When lever 1110 is pivoted to the second, outboard parking brake setting position shown in FIG. 7, lever 1172 is pivoted inboard. When lever 1172 pivots inboard, a brake pivot plate 1174 rotates clockwise (when viewed from above) about an axis C which is fixed relative to frame 2. The clockwise rotation of pivot plate 1174 causes connecting rod 1178 to be pulled forward which causes a brake bracket 1180 to be rotated forward to set parking brake 1190. The configuration and operation of a mechanical parking brake mechanism which is similar to parking brake mechanism 1170 is also described in U.S. Pat. No. 6,434,917 which is incorporated herein by reference.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A steering mechanism for an electric zero turn radius ("ZTR") vehicle having a vehicle frame and right and left drive wheels that are each powered by a respective left or right drive wheel motor, and a parking brake mechanism, the steering mechanism comprising:
   a pair of control lever assemblies including a right control lever assembly for controlling the right drive wheel motor and a left control lever assembly for controlling the left wheel motor, each control lever assembly including,
   (a) a pivot bracket assembly which is pivotably mounted to the frame of the electric ZTR vehicle for rotation about a first axis between a first position, through a neutral position and a second position, wherein the pivot bracket assembly has an outboard side and an opposite inboard side,
   (b) a position measurement device operably associated with the vehicle frame and the outboard side of the pivot bracket assembly by a shaft extending transverse between the vehicle frame and the pivot bracket assembly, the position measurement device is operable to measure the degree of rotation of the pivot bracket assembly with respect to the vehicle frame in relation to the first position and the second position, the position measurement device including a potentiometer, the potentiometer being able to provide signals to one of the drive wheel motors for controlling the direction of rotation and speed of rotation of said one of the drive wheel motors,
   (c) a dampener unit connecting between the pivot bracket assembly and the vehicle frame suitable for resisting the movement of the pivot bracket assembly,
   (d) a lever assembly pivotably mounted to the inboard side of the pivot bracket assembly for rotation with respect to the pivot bracket assembly about a second axis between a first inboard position and a second outboard position, the lever assembly interconnected with the parking brake mechanism such that moving the lever assembly to the second outboard position sets the parking brake.

2. The steering lever mechanism of claim 1, wherein the dampener unit further includes a spring for biasing the pivot bracket assembly toward the neutral position.

3. The steering lever mechanism of claim 1, further comprising:
   at least one sensor associated with at least one of the control lever assemblies for detecting when the at least one control lever assembly is in the second outboard position.

4. An electric zero turn radius ("ZTR") vehicle having a vehicle frame and right and left drive wheels that are each powered by a respective left or right drive wheel motor, a steering mechanism, and a parking brake mechanism, the steering mechanism comprising:
   a pair of control lever assemblies including a right control lever assembly for controlling the right drive wheel motor and a left control lever assembly for controlling the left wheel motor, each control lever assembly including,
   (1) a pivot bracket assembly which is pivotably mounted to the frame of the electric ZTR vehicle for rotation about a first axis between a first position, through a neutral position and a second position, wherein the pivot bracket assembly has an outboard side and an opposite inboard side, and
   (2) a position measurement device operably associated with the vehicle frame and the outboard side of the pivot bracket assembly by a shaft extending transverse between the vehicle frame and the pivot bracket assembly, the position measurement device is operable to measure the rotation or displacement of the pivot bracket assembly with respect to the vehicle frame in relation to the first position and the second position, the position measurement device being able to provide signals for controlling the direction of rotation and speed of rotation of said one of the drive wheel motors.

5. The electric ZTR vehicle of claim 4, wherein each control lever assembly further comprises a dampener unit connecting between the pivot bracket assembly and the vehicle frame suitable for resisting the movement of the pivot bracket assembly.

6. The electric ZTR vehicle of claim 5, wherein the dampener unit further includes a spring for biasing the pivot bracket assembly toward the neutral position.

7. The electric ZTR vehicle of claim 4, wherein each control lever assembly further comprises a lever assembly pivotably mounted to the pivot bracket assembly for rotation with respect to the pivot bracket assembly about a second axis between a first inboard position and a second outboard position.

8. The electric ZTR vehicle of claim 7, wherein the lever assembly is interconnected with the parking brake mechanism such that moving the lever assembly to the second outboard position sets the parking brake.

9. The electric ZTR vehicle of claim 4, wherein the steering lever mechanism further comprises at least one sensor associated with at least one of the control lever assemblies for detecting when the at least one control lever assembly is in the second outboard position.

10. The electric ZTR vehicle of claim 4 further comprising a drive control system capable to determine the direction of rotation and the speed of rotation of said one of the drive wheel motors from the position measurement device provided signals.

\* \* \* \* \*